(No Model.)

J. F. FRENCH.
HANDLE FOR FILES AND OTHER TOOLS.

No. 288,047. Patented Nov. 6, 1883.

WITNESSES:
John E. Parker
James F. Tobin

INVENTOR:
Josiah F. French
by his Attorneys
Howson & Sons

UNITED STATES PATENT OFFICE.

JOSIAH F. FRENCH, OF PHILADELPHIA, PENNSYLVANIA, ASSIGNOR OF ONE-HALF TO THE J. BARTON SMITH COMPANY, OF SAME PLACE.

HANDLE FOR FILES AND OTHER TOOLS.

SPECIFICATION forming part of Letters Patent No. 288,047, dated November 6, 1883.

Application filed September 24, 1883. (No model.)

*To all whom it may concern:*

Be it known that I, JOSIAH F. FRENCH, a citizen of the United States, and a resident of Philadelphia, Pennsylvania, have invented certain Improvements in Handles for Files and other Tools, of which the following is a specification.

My invention relates to that class of tangs and handles for files and other tools in which the handle is furnished with a threaded nut adapted to a threaded tang; and my invention consists, mainly, of the combination of a file or other tool having a tapering tang and a tapering thread thereon, with a handle provided with a nut having a tapering internal thread, to correspond with that on the tang, substantially as described hereinafter.

Figure 1:
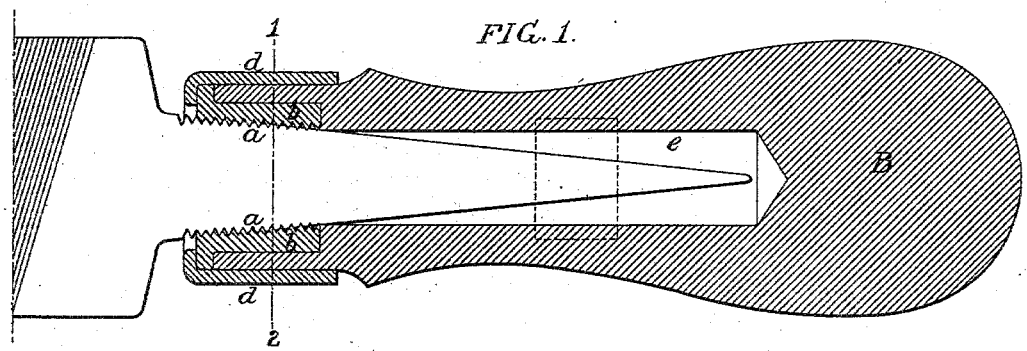
Figure 2:
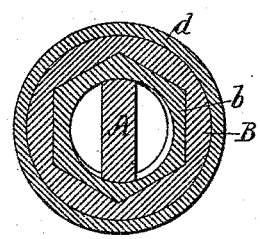
Figure 3:
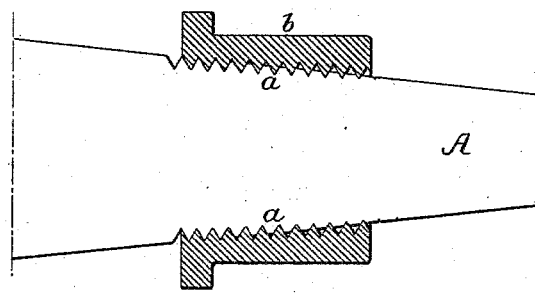

In the accompanying drawings, Figure 1 shows the handle and tang for files and other tools, the handle being in section; Fig. 2, a transverse section on the line 1 2, Fig. 1; Fig. 3, an enlarged view, showing the thread on the tang and nut; and Fig. 4, a view illustrating a modification of my invention.

Referring to Figs. 1 and 2, A is the tapering tang of a file or other tool, this tang being of the usual tapering wedge-like form, suitable to be driven into the wood of an ordinary handle when the special handle shown is not at hand. The tang, however, has a tapering thread, *a*, formed on its opposite edges, and this is adapted to a corresponding tapering internal thread in a nut, *b*, which is driven into the wooden portion of the handle, and is six-sided, or otherwise formed to prevent it from turning. The handle has a ferrule, *d*, the outer end of which, in the present instance, is bent over the flanged end of the nut, a feature claimed in the application filed by me August 24, 1883, Serial No. 104,634, allowed September 12, 1883, and therefore disclaimed here. The handle is screwed onto the tang until the tapering thread of the nut has a firm bearing on the thread of the tang, when the handle will be firmly secured to the file or other tool. It will be understood that the orifice *e* in the handle is of such size that the tang shall present no obstruction to the free turning of the handle in securing the same tight to the bearing.

A nut with a tapering internal thread may be secured to the handle in ways other than than that shown. It may, for instance, be embedded in the handle in the manner indicated by dotted lines in Fig. 1, the thread being in a position on the tang to correspond with that of the nut. I prefer, however, to locate the nut at the end of the handle, as shown in Fig. 1, so that the plain portion of the tang may be of considerable length for being driven into the wood of an ordinary handle when no special handle is at hand. It may be remarked, however, that if the edges of the thread on the tang do not protrude beyond the plain unthreaded edges of the same (see enlarged view, Fig. 3) the said thread will not materially interfere with the driving of the tang into a common handle.

Figure 4:
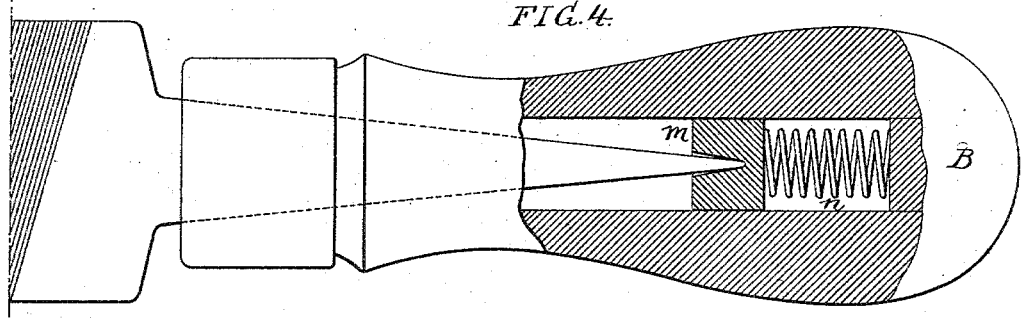

In the modification, Fig. 4, the tapering end of the tang is contained in a recess in a block, *m*, which is at liberty to slide in the orifice of the handle, so that it will accommodate itself to the length of the tang, a spiral spring, *n*, being interposed between the end of the orifice and the block, and forcing the latter against the tang, which it tends to so retain laterally that when the block is used the thread on the tang and in the nut may be much shorter than is shown in the drawings.

I disclaim the tang with a tapering thread, separately considered, as it is shown in the application filed by me September 18, 1883, Serial No. 106,695.

I claim as my invention—

1. The combination of a file or other tool having a tapering tang and a tapering thread thereon, with a handle provided with a fixed nut having a tapering internal thread to correspond with that on the edge of the tang, substantially as set forth.

2. The combination of the threaded tapering tang of a file or other tool with a handle having a nut adapted to the tang, a sliding block, *m*, recessed to receive the end of the tang. and a spiral spring interposed between the block and the end of the orifice in the handle, substantially as described.

In testimony whereof I have signed my name to this specification in the presence of two subscribing witnesses.

JOSIAH F. FRENCH.

Witnesses:
JAMES F. TOBIN,
HARRY SMITH.